US012511097B2

(12) United States Patent
Welti et al.

(10) Patent No.: US 12,511,097 B2
(45) Date of Patent: Dec. 30, 2025

(54) TECHNIQUES FOR DYNAMICALLY MANAGING A LOW-FREQUENCY SOUND FIELD USING NON-LOW-FREQUENCY LOUDSPEAKERS

(71) Applicant: HARMAN INTERNATIONAL INDUSTRIES, INCORPORATED, Stamford, CT (US)

(72) Inventors: Todd S. Welti, Thousand Oaks, CA (US); Jason Riggs, Northridge, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 268 days.

(21) Appl. No.: 17/883,437

(22) Filed: Aug. 8, 2022

(65) Prior Publication Data

US 2024/0045644 A1 Feb. 8, 2024

(51) Int. Cl.
*H04R 3/04* (2006.01)
*G06F 3/16* (2006.01)
*H04R 3/00* (2006.01)

(52) U.S. Cl.
CPC ............... *G06F 3/165* (2013.01); *H04R 3/04* (2013.01); *H04R 3/007* (2013.01)

(58) Field of Classification Search
CPC ....................... G06F 3/165; H04R 3/04–3/007
See application file for complete search history.

(56) References Cited

U.S. PATENT DOCUMENTS

| | | | | |
|---|---|---|---|---|
| 7,526,093 | B2 | 4/2009 | Devantier et al. | |
| 8,280,076 | B2 | 10/2012 | Devantier et al. | |
| 8,755,542 | B2 | 6/2014 | Devantier et al. | |
| 8,761,419 | B2 | 6/2014 | Devantier et al. | |
| 10,382,857 | B1 * | 8/2019 | Khanal | H04R 3/04 |
| 2007/0003075 | A1 * | 1/2007 | Cooper | H04S 3/00 381/98 |
| 2008/0199017 | A1 * | 8/2008 | Yamakawa | H04R 3/12 381/59 |
| 2010/0228368 | A1 * | 9/2010 | Oh | H04R 3/04 700/94 |
| 2013/0163784 | A1 * | 6/2013 | Tracey | H04R 3/04 381/103 |
| 2015/0010168 | A1 * | 1/2015 | Cheng | H04R 3/007 381/107 |
| 2019/0165749 | A1 * | 5/2019 | Slotnick | H03G 5/005 |
| 2020/0137493 | A1 * | 4/2020 | Mandell | H04R 3/04 |
| 2020/0288246 | A1 * | 9/2020 | Polleros | H04R 3/14 |

* cited by examiner

*Primary Examiner* — James K Mooney
(74) *Attorney, Agent, or Firm* — Artegis Law Group, LLP

(57) ABSTRACT

Disclosed embodiments include techniques for generating a low-frequency sound field for an audio system. A computing device in the audio system determines that a first playback level of an audio input is less than a maximum playback level of the audio system. Based on the first playback level, the computing device retrieves one or more first parameters associated with a first loudspeaker included in the audio system, where the one or more first parameters decrease a first cutoff frequency of the first loudspeaker to a second cutoff frequency. The computing device modifies a first portion of an audio signal transmitted to the first loudspeaker to decrease the first cutoff frequency to the second cutoff frequency based on the one or more first parameters.

20 Claims, 8 Drawing Sheets

TECHNIQUES FOR DYNAMICALLY MANAGING A LOW-FREQUENCY SOUND FIELD USING NON-LOW-FREQUENCY LOUDSPEAKERS

BACKGROUND

Field of the Embodiments of the Present Disclosure

Embodiments of the present disclosure relate generally to audio processing systems and, more specifically, to techniques for dynamically managing a low-frequency sound field using non-low-frequency loudspeakers.

Description of the Related Art

Audio systems for listening to music, watching television programs and feature films, and/or the like often employ a variety of loudspeakers to generate a sound field for one or more listeners. Each of the various loudspeakers in the audio system can be optimized to reproduce sound in a particular frequency range, such as high frequency sound, midrange frequency sound, and/or low-frequency sound. In some examples, a home theater system includes a set of midrange loudspeakers and high frequency range loudspeakers at strategically placed to provide a sound field that includes main loudspeakers and surround sound loudspeakers. The home theater system further includes one subwoofer, or sometimes two subwoofers, to reproduce sound below a relatively low cutoff frequency, such as 80 Hz, 120 Hz, and/or the like.

The low frequency range reproduced by subwoofers are subject to standing waves, particularly in relatively small environments, such as residential living rooms, home theater rooms, and/or the like. Such standing waves, also referred to herein as stationary waves occur when two sound waves of the same frequency form an interference pattern such that, when the sound waves are superimposed, the waves are added together at certain locations and cancelled out at other locations. A person sitting at a location where the waves are added together experiences a boost in the audio level at the frequency of the standing wave, whereas a person sitting at a location where the waves are cancelled out experiences a reduction in the audio level at the frequency of the standing wave. As a result, the experience of various users is different depending on where each user is sitting.

To address the issue of low-frequency sound waves, a user can optimize the low-frequency sound field in a room by strategically selecting from among multiple possible locations for each subwoofer in the room. However, due to the large size of subwoofer loudspeakers, the number and physical placement locations of subwoofers is relatively limited.

As the foregoing illustrates, improved techniques for generating low-frequency sound for an audio system would be useful.

SUMMARY

Various embodiments of the present disclosure set forth a computer-implemented method for generating a low-frequency sound field for an audio system. The method includes determining that a first playback level of an audio input is less than a maximum playback level of the audio system. The method further includes, based on the first playback level, retrieving one or more first parameters associated with a first loudspeaker included in the audio system, wherein the one or more first parameters decrease a first cutoff frequency of the first loudspeaker to a second cutoff frequency. The method further includes modifying a first portion of an audio signal transmitted to the first loudspeaker to decrease the first cutoff frequency to the second cutoff frequency based on the one or more first parameters.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that, with the disclosed techniques the number of effective loudspeakers within a sound system than can output low frequency sound is increased. This allows more of the loudspeakers in the sound system to output low frequencies, which improves the quality of the low-frequency sound field relative to prior art sound systems having the same loudspeakers. These technical advantages represent one or more technological improvements over prior art approaches.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Among other things, the disclosed embodiments are directed to an audio output device that employs techniques, referred to as dynamic sound field management (SFM), to generate a low-frequency sound field using a combination of subwoofers, and possibly midrange loudspeakers. The techniques characterize baseline measurements of each subwoofer included in an audio system at each listening location in the room. The techniques determine modifications of certain parameters (such as gain, delay, and filter parameters) to alter the signal transmitted to each subwoofer. Dynamic sound field management thereby simulates the combined effect of the subwoofers, including physical placement of the subwoofers and modification of signal parameters. Techniques for improving sound system performance for one or more listening positions in a given space are described more fully in U.S. Pat. No. 7,526,093, filed Apr. 28, 2009, and entitled "SYSTEM FOR CONFIGURING AUDIO SYSTEM," which is incorporated herein by reference.

In addition, dynamic sound field management performs the above process for midrange loudspeakers at various audio levels. Based on the current audio level, dynamic sound field management extends the effective frequency range of devices not normally thought of as "subwoofers" to cover a portion of the low-frequency range. For each relevant audio level, the techniques determine modifications of certain parameters (such as gain, delay, and filter) to alter the signal transmitted to each midrange loudspeaker. As long as the current playback audio level is less than the maximum for which the midrange loudspeaker is designed, such loudspeakers can be bandwidth-extended and still be within their safe operating area. As a result, at sufficiently low audio levels, one or more of the midrange loudspeakers can effectively be used as auxiliary subwoofers. The more subwoofers and effective subwoofers that are available, the better the resulting low-frequency sound field generated by the dynamic sound field management techniques disclosed herein.

Figure 1A:
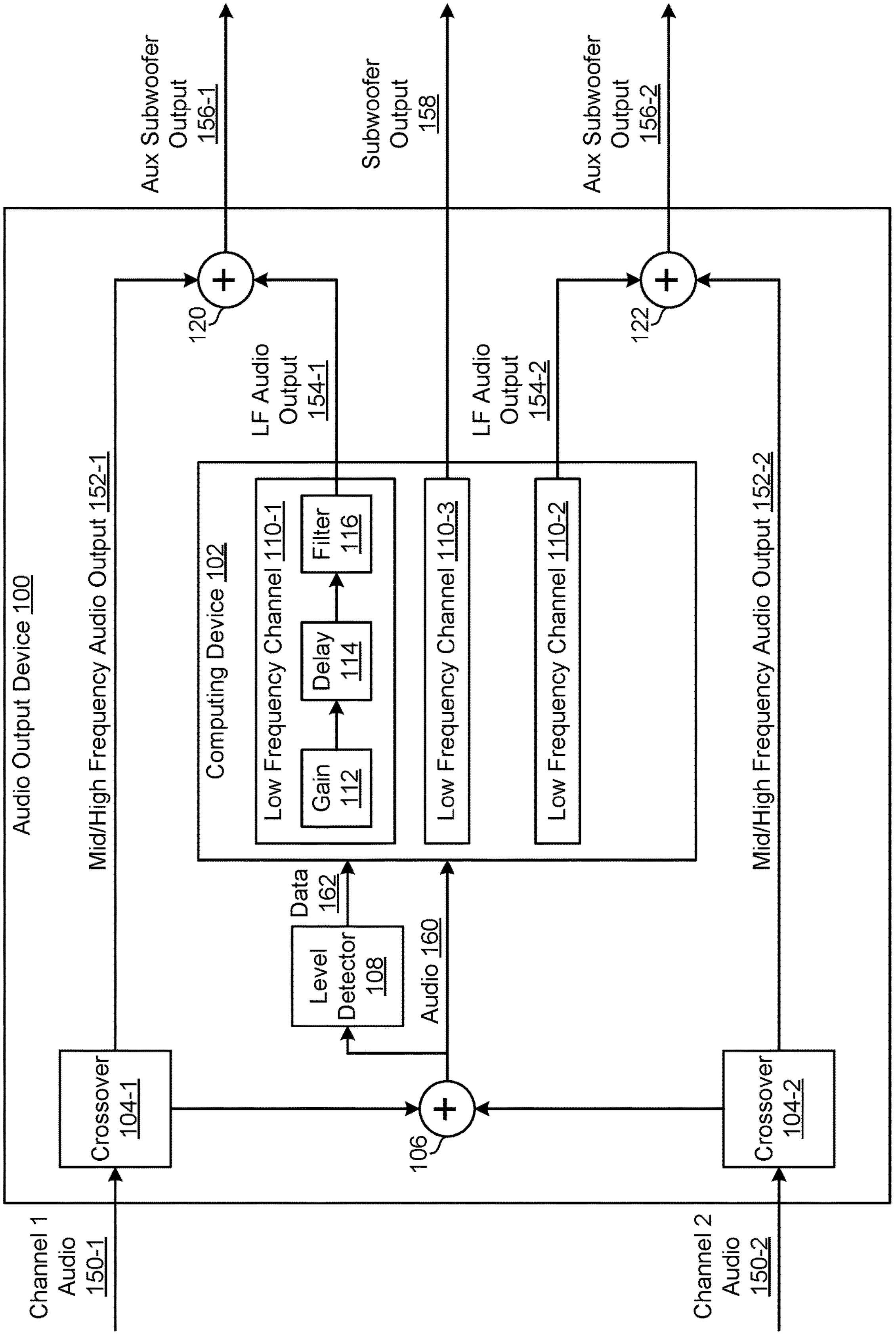
FIG. 1A illustrates an audio output device configured according to one or more aspects of the various embodiments.

FIG. 1A illustrates an audio output device 100 configured according to one or more aspects of the various embodiments. As shown, the audio output device 100 includes, without limitation, a computing device 102, crossovers 104-1 and 104-2, a mixer 106, and a level detector 108. The computing device 102 further includes a low-frequency channel 1 110-1, which includes a gain stage 112, a delay stage 114, and a filter stage 116. Similarly, the computing device 102 further includes a low-frequency channel 2 110-2, and a low-frequency channel 3 110-3, each of which includes a gain stage, a delay stage, and a filter stage (not shown).

In operation, crossover 104-1 receives channel 1 audio 150-1, such as a left or right channel of audio output device 100. Crossover 104-1 includes a highpass filter and a lowpass filter. Crossover 104-1 transmits the output of the highpass filter as the mid/high frequency audio output 152-1 for channel 1 of audio output device 100. Crossover 104-1 transmits the output of the lowpass filter as a first low-frequency input of a mixer 106. Similarly, crossover 104-2 receives channel 2 audio 150-2, such as a right or left channel of audio output device 100. Crossover 104-2 includes a highpass filter and a lowpass filter. Crossover 104-2 transmits the output of the highpass filter as the mid/high frequency audio output 152-2 for channel 2 of audio output device 100. Crossover 104-2 transmits the output of the lowpass filter as a second low-frequency input of mixer 106.

Mixer 106 mixes the first low-frequency input received from crossover 104-1 and the second low-frequency input from crossover 104-2 to generate a mono low-frequency audio signal 160. In some examples, mixer 106 adds the first low-frequency input from crossover 104-1 to the second low-frequency input from crossover 104-2. In some examples, mixer 106 mixes the first low-frequency input from crossover 104-1 with the second low-frequency input from crossover 104-2 using any technologically feasible mixing technique. Mixer 106 transmits the audio signal 160 to computing device 102 and level detector 108.

Level detector 108 analyzes the audio signal 160 from mixer 106 and determines an audio level associated with the audio signal 160. In some examples, level detector 108 detects the instantaneous audio level of the audio signal 160 generated by mixer 106. In some cases, performing the disclosed techniques based on the instantaneous audio level of the audio signal 160 can cause significant changes to the generated audio signal in a relatively short period of time, increasing the chance of distortion and other negative audio artifacts in the generated audio output. Therefore, in some examples, level detector 108 integrates the audio level of the audio signal 160 generated by mixer 106 over a set period of time, such as 200 ms. Similarly, in some examples, level detector 108 averages the audio level of the audio signal 160 generated by mixer 106 over a set period of time, such as 200 ms. In some examples, level detector 108 determines the root-mean-square (RMS) value of the audio signal 160. Additionally or alternatively, level detector 108 performs any technically feasible aggregating technique to the audio signal 160 generated by mixer 106. Level detector 108 generates data 162 indicating the result of the level detection process. Level detector 108 transmits the data to the computing device 102.

Computing device 102 receives the audio signal 160 generated by mixer 106 and the data generated by level detector 108. In operation, computing device 102 generates multiple low frequency channels, such as low frequency channel 1 110-1 and low frequency channel 2 110-2. Each low frequency channel 110 includes a gain stage 112, a delay stage 114, and a filter stage 116. The gain stage 112, delay stage 114, and filter stage 116 apply parameter values for a given low frequency channel 110 to adjust the gain, delay, and filter settings, respectively. Adjusting the gain, delay, and filter parameters provides improved low-frequency performance independent of loudspeaker placement when implemented in the audio sound system that includes audio output device 100. Computing device 102 applies the adjusted parameter values to the low frequency channels 110 for one or more of the loudspeakers.

Computing device 102 repeats these steps to dynamically manage which non-subwoofer loudspeakers, such as midrange loudspeakers, can effectively be used as auxiliary subwoofers and to what extent. As the current playback level increases and decreases, computing device 102 adds and/or removes non-subwoofer loudspeakers from the set of loudspeakers that can be effectively used as auxiliary subwoofers. The more subwoofers and effective subwoofers that are available, the better the resulting low-frequency sound field generated by the dynamic sound field management techniques disclosed herein. Further, as the current playback level increases and decreases, computing device 102 correspondingly decreases or increases the volume level of the low-frequency portion of the audio input signal to mix with the midrange and high-frequency portion of the audio input signal prior to transmitting the audio signal to the auxiliary subwoofer. Computing device 102 performs these operations in parallel for multiple non-subwoofer loudspeakers in the audio system to dynamically enhance the low-frequency sound field as the playback level changes over time.

In some examples, the filter stage 116 includes a shelving filter. The shelving filter amplifies audio signals at frequencies below the nominal cutoff frequency of the loudspeaker. In effect, the shelving filter decreases the nominal cutoff frequency of the loudspeaker to a lower effective cutoff frequency. When the playback level for a particular loudspeaker is below the maximum playback level, computing device determines an extended cutoff frequency based on the current playback level and the operating curve of loudspeaker. Computing device 102 sets the amplification level for frequencies below the nominal cutoff frequency such that amplitude of the low frequency signals is increased to the current playback level for midrange and high frequency signals. In this manner, the loudspeaker is effective as an auxiliary subwoofer when operating at reduced playback levels. Further, computing device 102 adjusts the parameters for the gain stage 112 in order to compensate for any effect that the filter stage 116 applies to frequencies above the cutoff frequency. In this manner, the shelving filter impacts the low frequency portion of the loudspeaker signal and not the midrange or high frequency portions of the loudspeaker signal.

Computing device 102 generates the low frequency channels in two phases: a setup phase and a runtime phase.

During the setup phase, computing device 102 calibrates level detector 108 to the maximum playback level of the audio system that includes audio output device 100. Computing device 102 measures the transfer function between each loudspeaker of the audio system and each listening location in the room at this maximum playback level. Computing device 102 calculates suitable parameters, such as gain, delay, and filter parameters, for the loudspeakers at the maximum playback level. These parameters establish a baseline for the audio system when the playback level is at or near the maximum and the subwoofers are generating the low-frequency sound field.

Computing device 102 calculates additional gain, delay, and filter parameters at successively lower playback levels. At each step, computing device reduces the playback level by a certain amount, such as 3 decibels (dB), 1 dB, 0.1 dB, and/or the like. In general, larger step sizes reduce the time to calculate the additional gain, delay, and filter parameters during the setup phase, but result in coarser resolution of the parameter adjustments at reduced playback levels. Conversely, smaller step sizes provide finer parameter adjustments at the expense of a longer time to calculate the additional gain, delay, and filter parameters during the setup phase.

At each step, computing device 102 determines the lowest cutoff frequency for each non-subwoofer loudspeaker such that the loudspeaker can still be in its safe operating area. The safe operating area of a loudspeaker defines the maximum playback level at various frequencies at which the loudspeaker can reproduce sound with little to no distortion and without sustaining physical damage. The nominal cutoff frequency of a loudspeaker defines the lowest frequency that the loudspeaker can safely reproduce at the maximum playback level for the loudspeaker. Driving the loudspeaker at the maximum playback level below the cutoff frequency can cause distortion of the reproduced sound, resulting in poor audio quality. In extreme cases, driving the loudspeaker at the maximum playback level below the cutoff frequency can cause the loudspeaker components to be subject to excursion beyond the design limits, which can result in damage to the loudspeaker. As the playback level is reduced, however, the loudspeaker can be safely driven at lower frequencies.

In some examples, the cutoff frequencies and safe operating area for a given loudspeaker is known a priori. In such examples, the manufacturer of the loudspeaker typically provides the cutoff frequencies and safe operating area for the loudspeaker. In some examples, the cutoff frequencies and safe operating area for a given loudspeaker is determined by measurement. The measurement can be performed by an audio technician, an audio system installer, a user, and/or the like. Lowering the cutoff frequency allows the bandwidth of the loudspeaker to be extended on the low side into the subwoofer frequency range while still operating safely.

If the bandwidth of a given non-subwoofer loudspeaker cannot be extended to lower frequencies at the playback level associated with the current step, then the given loudspeaker is not included as an auxiliary subwoofer. If, however, the bandwidth of a given non-subwoofer loudspeaker can be extended to lower frequencies at the playback level associated with the current step, then the given loudspeaker is included as an auxiliary subwoofer. For each loudspeaker selected as an auxiliary subwoofer, computing device 102 determines suitable parameters, such as gain, delay, and filter parameters, for the loudspeaker. As a result, at each reduced playback level, computing device 102 selects the loudspeakers to be used as auxiliary subwoofers along with suitable parameters for the selected loudspeakers at the reduced playback level. Computing device 102 repeats these steps for each non-subwoofer loudspeaker at successively lower playback levels until some threshold is reached, such as a minimum playback level, a defined number of steps, and/or the like. Computing device 102 generates and stores a lookup table where each entry of the lookup table identifies, for a given playback level, the set of loudspeakers available as auxiliary subwoofer and suitable parameters for each of the selected loudspeakers.

During the runtime phase, computing device 102 determines the current playback level of the audio system by monitoring the output of level detector 108. In some examples, computing device 102 measures the current playback level relative to a maximum playback level. In such examples, computing device 102 can determine that the current playback level is at a determined level below the maximum playback level, such as 3 dB below the maximum playback level, 5 dB below the maximum playback level, and/or the like. Computing device 102 determines which entry of the lookup table corresponds most closely to the current playback level. Computing device 102 retrieves this lookup table entry. Based on the lookup table entry, computing device 102 determines which non-subwoofer loudspeakers are available as auxiliary subwoofers. Computing device 102 modifies the parameters, such as gain, delay, and filter, for each of the auxiliary subwoofers based on the lookup table entry.

As shown, computing device 102 generates multiple low-frequency audio outputs, such as low-frequency audio output 154-1 and low-frequency audio output 154-2. Computing device 102 transmits each low-frequency audio output 154 to a different loudspeaker. If a given low-frequency audio output 154 is for a subwoofer, then computing device 102 transmits the low-frequency audio output 154 directly to the loudspeaker. If a given low-frequency audio output 154 is for an auxiliary subwoofer, then computing device 102 transmits the low-frequency audio output 154 to a mixer 120/122. The mixer 120/122 combines the low-frequency audio output 154 with a corresponding mid/high frequency audio output 152. The mixer 120/122 transmits the combined audio output to the auxiliary subwoofer.

As shown, mixer 120 receives the mid/high frequency audio output 152-1 from the highpass filter in the crossover 104-1 for channel 1. Mixer 120 further receives the low frequency audio output 154-1 from low frequency channel 1 110-1 included in computing device 102. Mixer 120 combines these two audio signals to generate an auxiliary (aux) subwoofer output 156-1. Mixer 120 transmits the auxiliary subwoofer output 156-1 to a first loudspeaker being used as an auxiliary subwoofer. Similarly, mixer 122 receives the mid/high frequency audio output 152-2 from the highpass filter in the crossover 104-2 for channel 2. Mixer 122 further receives the low frequency audio output 154-2 from low frequency channel 2 110-2 included in computing device 102. Mixer 122 combines these two audio signals to generate an auxiliary (aux) subwoofer output 156-2. Mixer 122 transmits the auxiliary subwoofer output 156-2 to a second loudspeaker being used as an auxiliary subwoofer. In addition, low-frequency channel 110-3 generates a subwoofer output 158 and transmits the subwoofer output 158 directly to the subwoofer loudspeaker.

In some examples, computing device 102 includes an output limiter (not shown) for each low-frequency audio output 154. The output limiter provides a mechanism to reduce the rate of change of the signal transmitted via each low-frequency audio output 154. A large rate of change in the signal transmitted via a low-frequency audio output 154 could lead to audible nonlinear distortion. By limiting the rate of change, computing device 102 reduces the likelihood of such distortion.

Figure 1B:
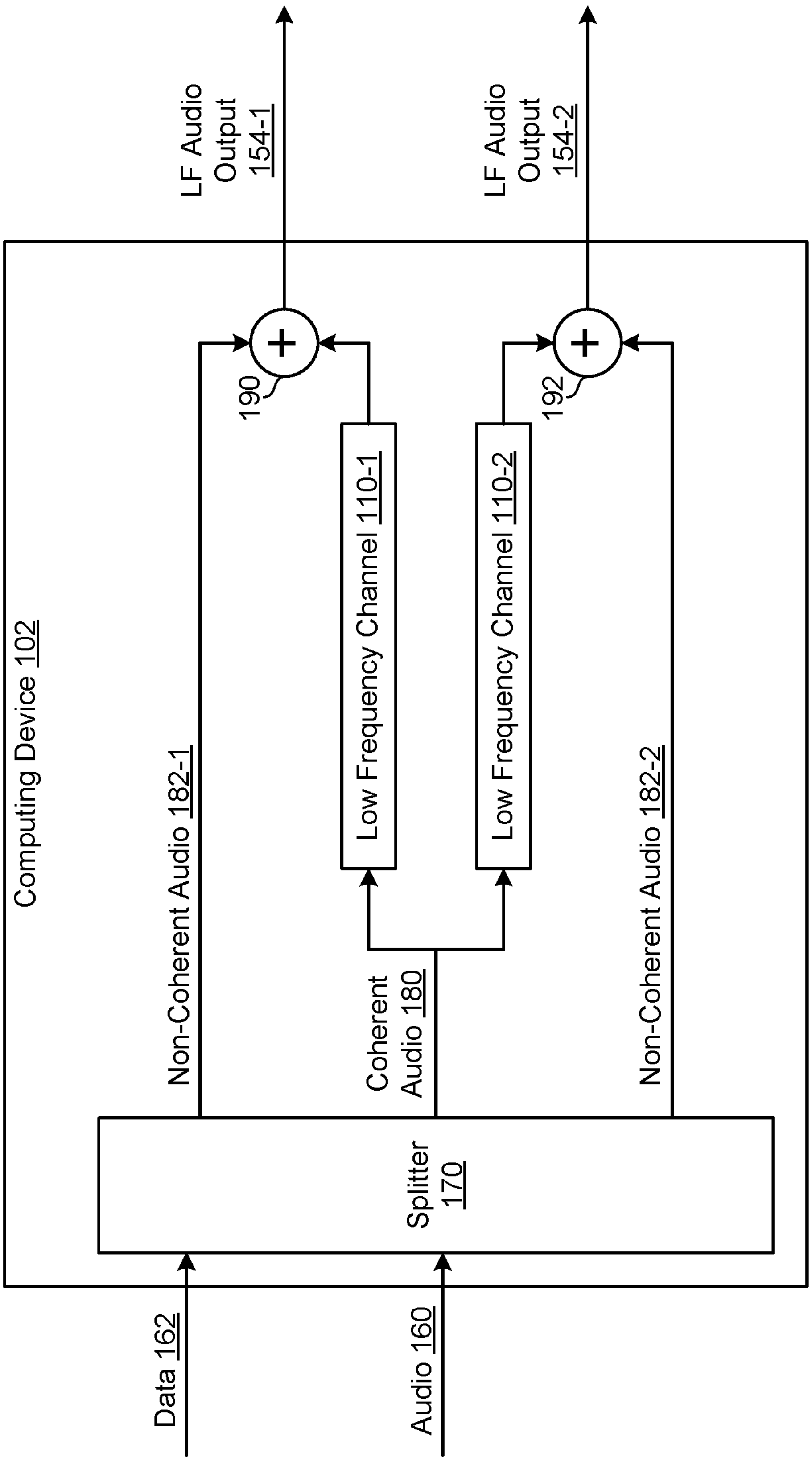
FIG. 1B illustrates an alternative configuration for the computing device of FIG. 1A according to one or more aspects of the various embodiments.

FIG. 1B illustrates an alternative configuration for the computing device 102 of FIG. 1A according to one or more aspects of the various embodiments. In some examples, audio output device 100 isolates the coherent portion of the outputs of the lowpass filters in the crossovers 104-1 and 104-2. Computing device 102 modifies the parameters via gain stage 112, delay stage 114, and filter stage 116 for only the coherent portion of the outputs of the lowpass filters in the crossovers 104-1 and 104-2. In such examples, computing device 102 includes a splitter 170 that separates the coherent audio 180 from the input audio 160. Splitter 170 transmits the coherent audio 180 to low frequency channel 110-1 for processing. Further, splitter 170 transmits the non-coherent audio 182-1 portion of the output of the lowpass filter of the first channel directly to mixer 190 without modifying the parameters for the non-coherent portion. Mixer 190 combines (L, sums and/or mixes) the non-coherent audio 182-1 with the output of the low frequency channel 110-1 and transmits the combined audio signal to a first auxiliary subwoofer as LF audio output 154-1. Similarly, splitter 170 transmits the coherent audio 180 to low frequency channel 110-2 for processing. Further, splitter 170 transmits the non-coherent audio 182-2 portion of the output of the lowpass filter of the first channel directly to mixer 192 without modifying the parameters for the non-coherent portion. Mixer 192 combines (g, sums and/or mixes) the non-coherent audio 182-2 with the output of the low frequency channel 110-2 and transmits the combined audio signal to a second auxiliary subwoofer as LF audio output 154-2. In this manner, computing device 102 preserves any stereo bass and/or surround bass audio that may be present in the low-frequency portion of the audio input.

It will be appreciated that the system shown herein is illustrative and that variations and modifications are possible. Audio output device 100 is shown as having two inputs, channel 1 audio 150-1 and channel 2 audio 150-2, such as a left channel and a right channel of a stereophonic system. However, audio output device 100 can have any number of input audio channels within the scope of the present disclosure. Similarly, audio device is shown as having two crossovers 104-1 and 104-2 that generate mid/high frequency audio outputs 152-1 and 152-2, respectively. However, audio output device 100 can have any number of crossovers 104 and/or mid/high frequency audio outputs 152 within the scope of the present disclosure. Computing device 102 is shown as having two low frequency channels 110-1 and 110-2 that generate two low-frequency audio outputs 154-1 and 154-2, respectively, for auxiliary subwoofers. Two mixers 120 and 122 mix low-frequency audio outputs 154-1 and 154-2 with mid/high frequency audio outputs 152-1 and 152-2 to generate auxiliary subwoofer outputs 156-1 and 156-2, respectively. Computing device 102 is further shown as having one low frequency channel 110-3 that generates a subwoofer output 158 to transmit directly to a subwoofer. However, computing device can have any number of low frequency channels 110 that generate any number of low-frequency audio outputs 154 for auxiliary subwoofers and/or any number of subwoofer outputs 158 for subwoofers within the scope of the present disclosure.

Each of the low frequency channels 110 includes a gain stage 112 followed by a delay stage 114 followed by a filter stage 116. However, any one or more of the low frequency channels 110 can omit one or more of these stages within the scope of the present disclosure. In addition, any one or more of the low frequency channels 110 can include additional stages for modifying additional parameters associated with the low frequency channels 110 within the scope of the present disclosure. Further, the gain stage 112, delay stage 114, and filter stage 116 can be arranged in any technically feasible order within the scope of the present disclosure. Crossovers 104-1 and 104-2, mixer 106 and level detector 108 are shown as discrete components external to computing device 102. However, computing device 102 can implement any one or more of these components, and/or other components, in whole or in part within the scope of the present disclosure. Low frequency channels 110, and included gain stage 112, delay stage 114, and filter stage 116, are shown as implemented within computing device 102. However, any one or more of these components can be implemented, in whole or in part, as discrete components external to computing device 102 within the scope of the present disclosure.

Figure 2:
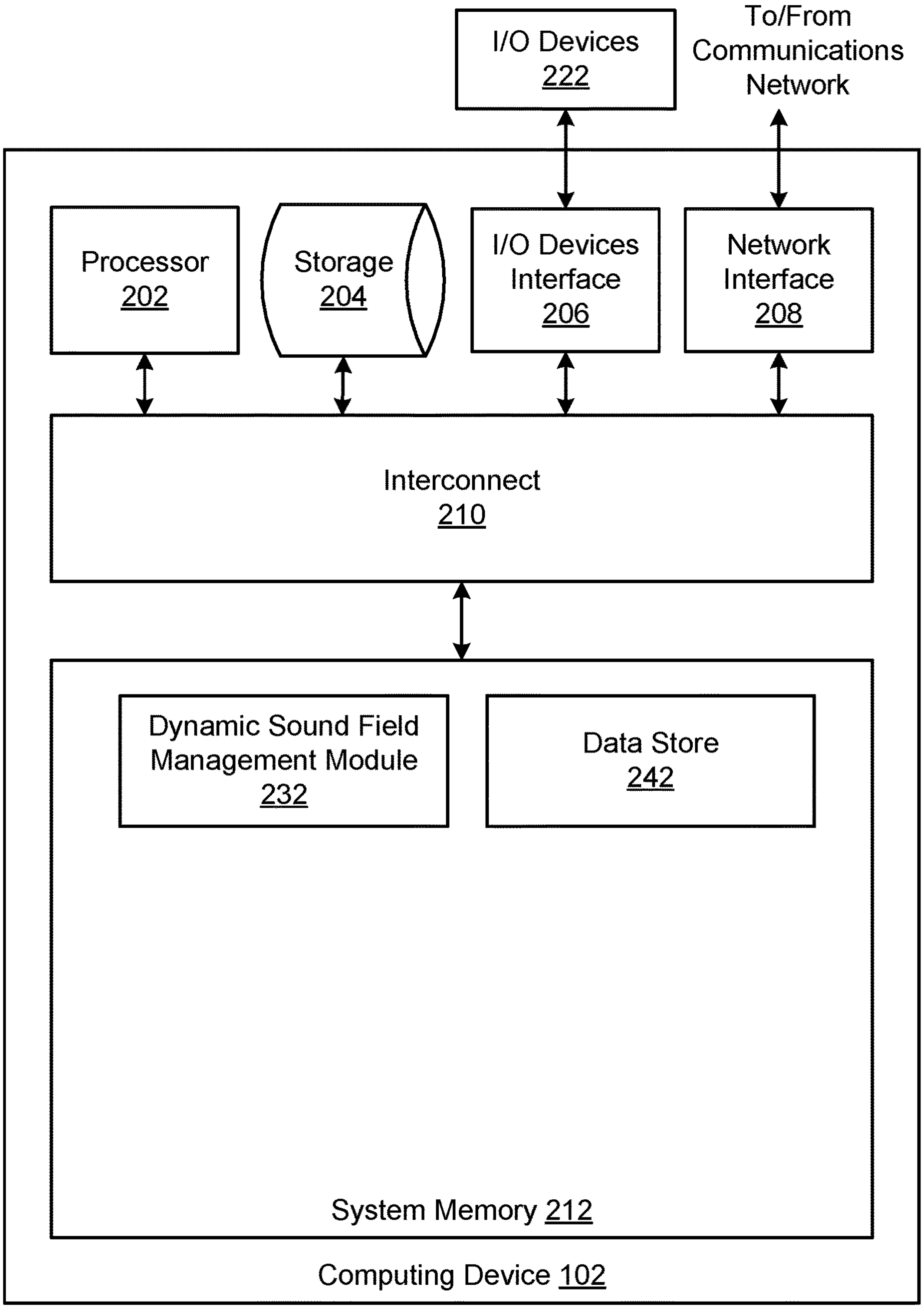
FIG. 2 is a block diagram of the computing device included in the audio device of FIGS. 1A-1B configured to implement one or more aspects of the various embodiments.

FIG. 2 is a block diagram of the computing device 102 included in the audio output device 100 of FIGS. 1A-1B configured to implement one or more aspects of the various embodiments. As shown, the computing device 102 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, I/O devices interface 206, storage 204, network interface 208, and system memory 212. The I/O devices interface 206 is configured to receive input data from user I/O devices 222. Examples of user I/O devices 222 can include one or more buttons, a keyboard, a mouse, or other pointing device, and/or the like. The I/O devices interface 206 may also include an audio output unit configured to generate an electrical audio output signal, and user I/O devices 222 may further include one or more loudspeakers configured to generate an acoustic output in response to the electrical audio output signal. Another example of a user I/O device 222 is a display device that generally represents any technically feasible means for generating an image for display. For example, the display device could be a liquid crystal display (LCD) display, organic light-emitting diode (OLED) display, or digital light processing (DLP) display. Further, the display device can project an image onto one or more surfaces, such as walls, projection screens or a windshield of a vehicle. Additionally or alternatively, the display device may project an image directly onto the eyes of a user (via retinal projection).

Processor 202 is representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a dynamic sound field management module 232 and a data store 242. The dynamic sound field management module 232, when executed by the processor 202, perform one or more operations associated with the techniques further described herein. When performing the operations associated with the disclosed techniques, the dynamic sound field management module 232 stores data in and retrieves data from data store 242.

Figure 3:
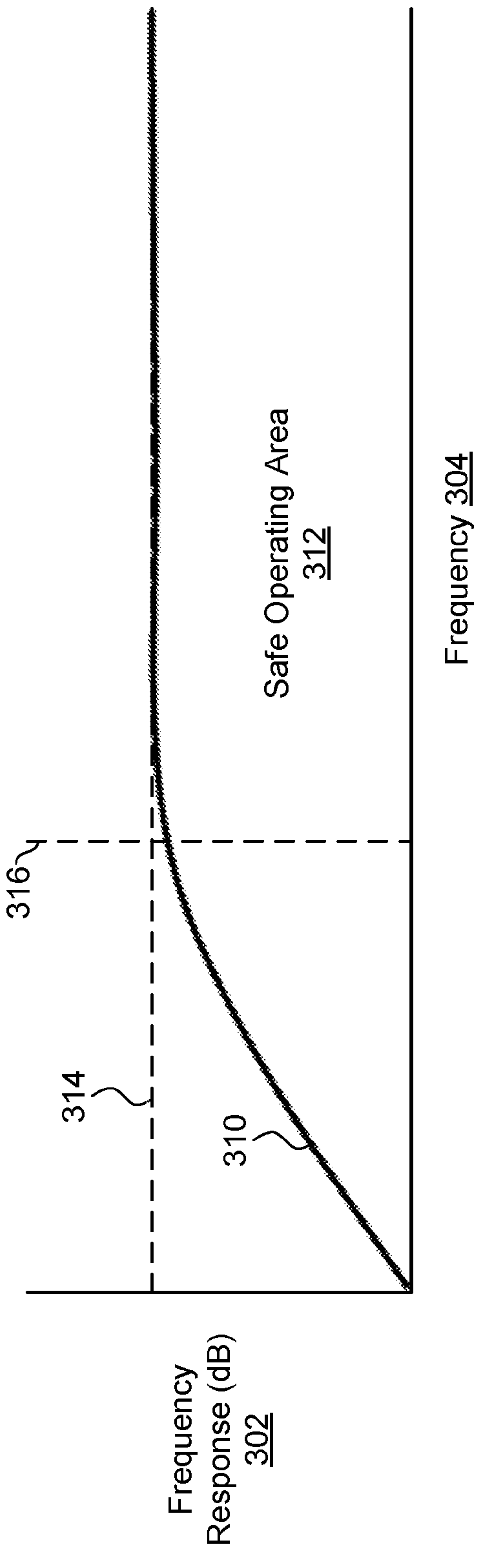
FIG. 3 illustrates a safe operating area for a loudspeaker, according to various embodiments.

FIG. 3 illustrates a safe operating area for a loudspeaker, according to various embodiments. As shown, a loudspeaker has an operating curve 310 that shows frequency response in dB 302 of the loudspeaker against operating frequency 304. The operating curve 310 defines a safe operating area 312 for the loudspeaker. The nominal playback level 314 remains constant, or nearly constant, at frequencies above the cutoff frequency 316. As the frequency falls below the cutoff frequency 316, the frequency response decreases. One reason for this decrease is that the distance traveled by the loudspeaker components, referred to as excursion, increases as the frequency decreases. The excursion of a loudspeaker is generally limited by the physical construction of the loudspeaker. Driving the loudspeaker in a matter that exceeds the excursion limit, the loudspeaker can result in a distorted audio signal and/or physical damage to the loudspeaker. Therefore, the operating curve 310 shows a reduced frequency response below the cutoff frequency 316 in order to prevent distortion and/or physical damage. Any frequency response profile that stays within the safe operating area 312 does not cause distortion or physical damage to the loudspeaker.

Figure 4:
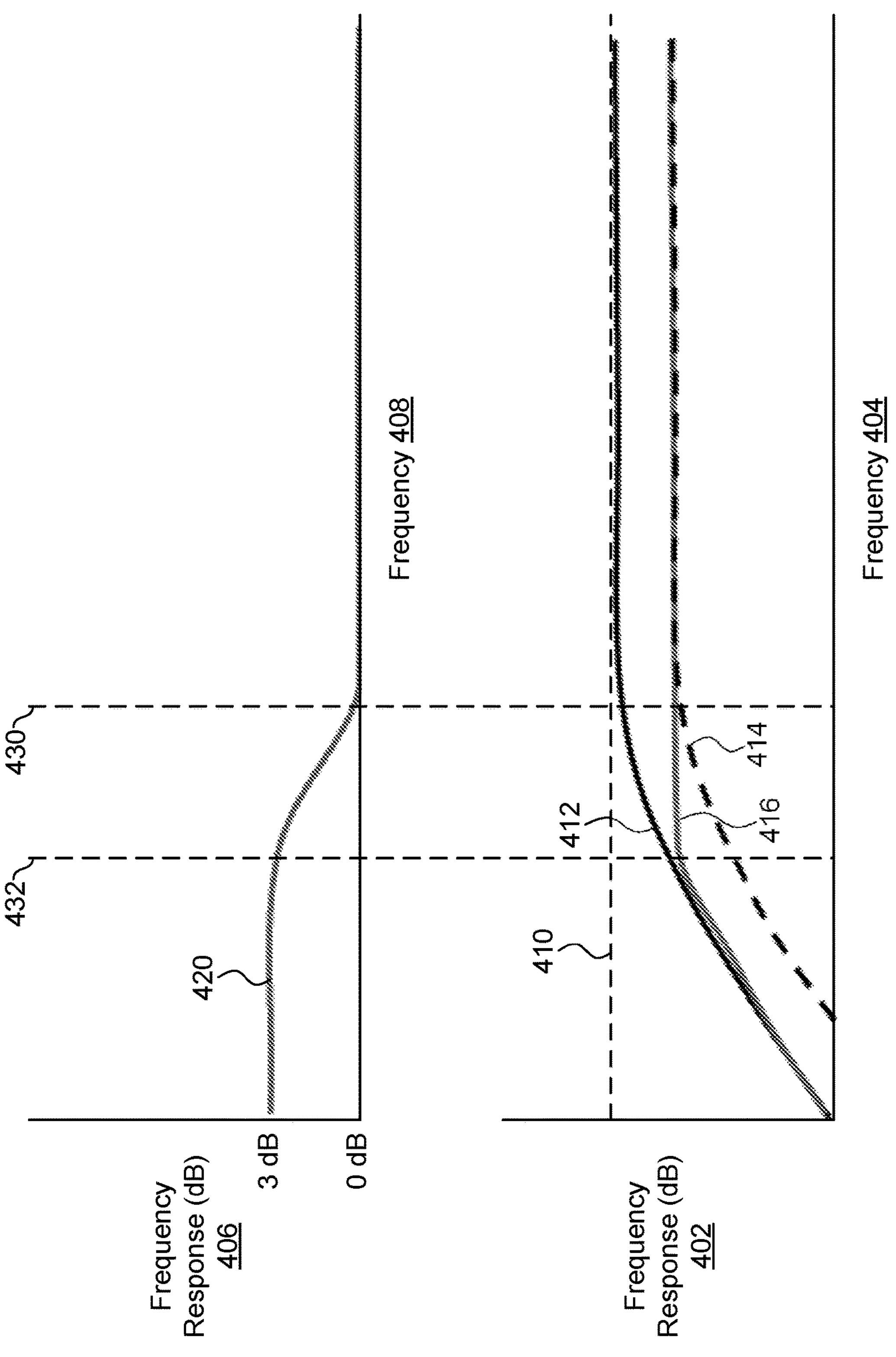
FIG. 4 illustrates extending the effective bandwidth at a given playback audio level for a loudspeaker, according to various embodiments.

FIG. 4 illustrates extending the effective bandwidth at a given playback audio level for a loudspeaker, according to various embodiments. As shown, a loudspeaker has a nominal operating curve 412 that shows frequency response in dB 402 of the loudspeaker against operating frequency 404 at a nominal playback level 410. The nominal operating curve 412 defines a safe operating area for the loudspeaker. The nominal playback level 410 remains constant, or nearly constant, at frequencies above the nominal cutoff frequency 430. As the frequency falls below the nominal cutoff frequency 430, the frequency response decreases.

If the loudspeaker is driven at a reduced playback level, such as 3 dB below the nominal playback level 410, then the loudspeaker operates with a reduced operating curve 414. Again, as the frequency falls below the nominal cutoff frequency 430, the frequency response decreases. With the disclosed techniques, the effective bandwidth of the loudspeaker can be increased at the reduced playback level by applying a shelving filter to shift the nominal cutoff frequency 430 to a lower effective cutoff frequency 432. The response curve 420 of the shelving filter is shown as frequency response in dB 406 against operating frequency 408. As shown, the shelving filter does not affect the loudspeaker above the nominal cutoff frequency 430 because 0 dB is added to the output of loudspeaker. As the frequency is decreased from the nominal cutoff frequency 430 to the effective cutoff frequency 432, the shelving filter increases the output of the loudspeaker accordingly. At frequencies below the effective cutoff frequency 432, the shelving filter increases the output of the loudspeaker by an amount equivalent to the difference between the nominal operating curve 412 and the reduced operating curve 414. As shown in the example of FIG. 4, this amount is 3 dB, however the shelving filter can increase the output of the loudspeaker by other amounts as is discussed in further detail below. After applying the shelving filter, the loudspeaker operates with an extended operating curve 416. With this extended operating curve 416, the loudspeaker utilizes more of the safe operating area at lower playback levels, which allows the loudspeaker to output more low frequency audio than without the shelving filter making the loudspeaker effective as an auxiliary subwoofer.

Figure 5:
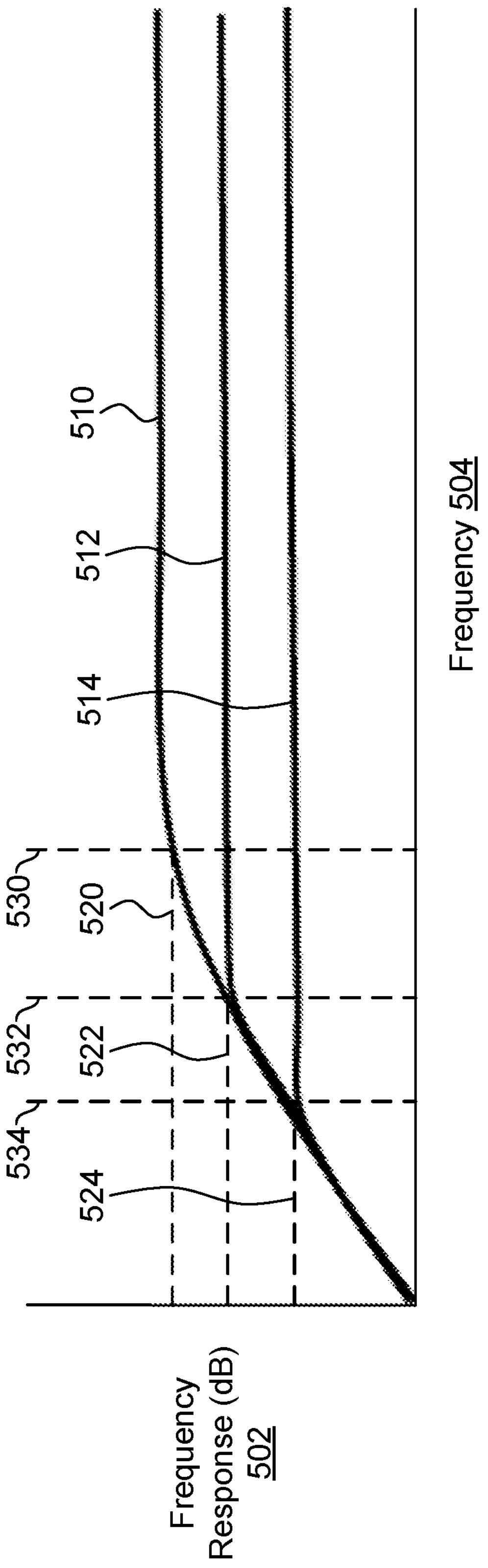
FIG. 5 illustrates extending the effective bandwidth at multiple playback audio levels for a loudspeaker, according to various embodiments.

FIG. 5 illustrates extending the effective bandwidth at multiple playback audio levels for a loudspeaker, according to various embodiments. As shown, a loudspeaker has a nominal operating curve 510 that shows frequency response in dB 502 of the loudspeaker against operating frequency 504 at a nominal playback level 520. The nominal operating curve 510 defines a safe operating area for the loudspeaker. The nominal playback level 520 remains constant, or nearly constant, at frequencies above the nominal cutoff frequency 530. As the frequency falls below the nominal cutoff frequency 530, the frequency response decreases.

At a first reduced playback level, an audio device, such as audio output device 100, applies a shelving filter such that the loudspeaker operates with a first extended operating curve 512. In some examples, the shelving filter is included in the filter stage 116 of a low frequency channel 110. The first extended operating curve 512 defines a safe operating area for the loudspeaker at the first reduced playback level 522. The first reduced playback level 522 remains constant, or nearly constant, at frequencies above the first reduced cutoff frequency 532. As the frequency falls below the first reduced cutoff frequency 532, the frequency response decreases. With this first extended operating curve 512, the loudspeaker utilizes more of the safe operating area at lower playback levels, making the loudspeaker effective as an auxiliary subwoofer.

At a second reduced playback level, the audio output device 100 adjusts the parameters of the shelving filter such that the loudspeaker operates with a second extended operating curve 514. The second extended operating curve 514 defines a safe operating area for the loudspeaker at the second reduced playback level 524. The second reduced playback level 524 remains constant, or nearly constant, at frequencies above the second reduced cutoff frequency 534. As the frequency falls below the second reduced cutoff frequency 534, the frequency response decreases. With this second extended operating curve 514, the loudspeaker utilizes even more of the safe operating area at lower playback levels, making the loudspeaker even more effective as an auxiliary subwoofer.

Figure 6:
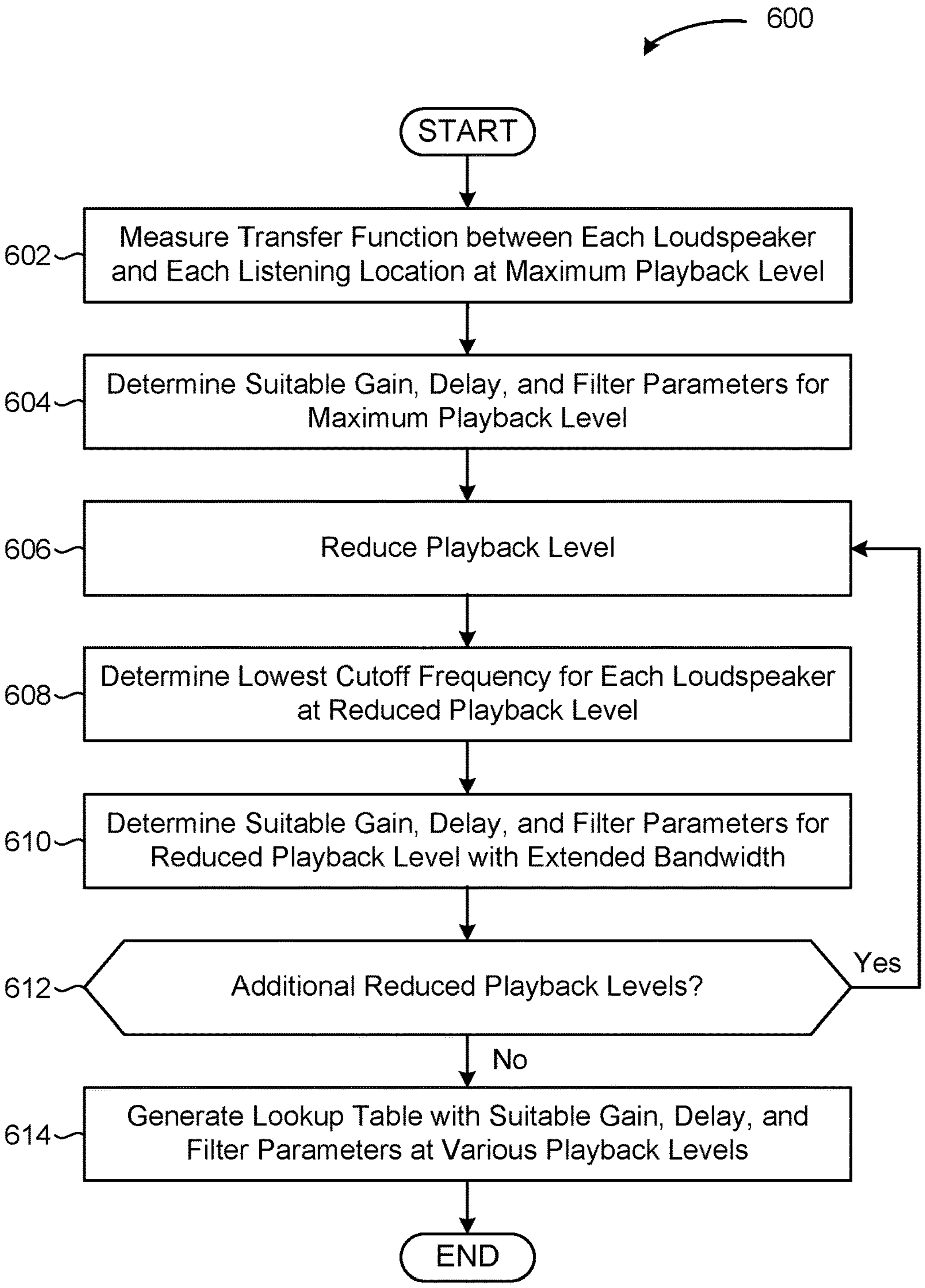
FIG. 6 is a flow diagram of method steps for configuring an audio device for dynamic sound field management, according to various embodiments.

FIG. 6 is a flow diagram of method steps for configuring an audio device for dynamic sound field management, according to various embodiments. Although the method steps are described in conjunction with the systems of FIGS. 1A-5, persons skilled in the art will understand that any system configured to perform the method steps, in any order, is within the scope of the present disclosure.

As shown, a method 600 begins at step 602, where a computing device, such as computing device 102, included in an audio device measures the transfer function between each loudspeaker of the audio system and each listening location in the room at a maximum playback level. In some examples, computing device calibrates a level detector, such as level detector 108, to the maximum playback level of the audio system that includes the audio device.

At step 604, the computing device determines suitable parameters, such as gain, delay, and filter parameters, for the loudspeakers at the maximum playback level. These parameters establish a baseline for the audio system when the playback level is at or near the maximum and the subwoofers are generating the low-frequency sound field.

At step 606, the computing device reduces the playback level of the audio system by a specified amount, such as 3 dB, 1 dB, 0.1 dB, and/or the like. In general, larger step sizes reduce the time to calculate the additional gain, delay, and filter parameters at the reduced playback levels, but result in coarser resolution of the parameter adjustments at reduced playback levels. Conversely, smaller step sizes provide finer parameter adjustments at the expense of a longer time to calculate the additional gain, delay, and filter parameters at the reduced playback levels.

At step 608, the computing device determines the lowest cutoff frequency for each loudspeaker at the reduced playback level. More specifically, the computing device determines the lowest cutoff frequency for each non-subwoofer loudspeaker such that the loudspeaker can still be in the safe operating area. The nominal cutoff frequency of a loudspeaker defines the lowest frequency that the loudspeaker can safely reproduce at the maximum playback level for the loudspeaker. Driving the loudspeaker at the maximum playback level below the cutoff frequency can cause distortion of the reproduced sound, resulting in poor audio quality. In extreme cases, driving the loudspeaker at the maximum playback level below the cutoff frequency can cause the loudspeaker components to be subject to excursion beyond the design limits, which can result in physical damage to the loudspeaker. As the playback level is reduced, however, the loudspeaker can be safely driven at lower frequencies.

In some examples, the cutoff frequencies and safe operating area for a given loudspeaker is known a priori. In such examples, the manufacturer of the loudspeaker typically provides the cutoff frequencies and safe operating area for the loudspeaker. In some examples, the cutoff frequencies and safe operating area for a given loudspeaker is determined by measurement. The measurement can be performed by an audio technician, an audio system installer, a user, and/or the like. Lowering the cutoff frequency allows the bandwidth of the loudspeaker to be extended on the low side into the subwoofer frequency range while still operating safely.

At step 610, the computing device determines suitable gain, delay, and filter parameters at the reduced playback level for each non-subwoofer loudspeaker that can be extended to lower frequencies at the current reduced playback level. If the bandwidth of a given non-subwoofer loudspeaker cannot be extended to lower frequencies at the current reduced playback level, then the given loudspeaker is not included as an auxiliary subwoofer. If, however, the bandwidth of a given non-subwoofer loudspeaker can be extended to lower frequencies at the current reduced playback level, then the given loudspeaker is included as an auxiliary subwoofer. For each loudspeaker selected as an auxiliary subwoofer, the computing device determines suitable parameters, such as gain, delay, and filter parameters, for the loudspeaker.

The computing device performs this process for each non-subwoofer loudspeaker in the audio system, such as midrange loudspeakers. In this manner, the computing device determines which non-subwoofer loudspeakers are available for contributing to the low-frequency sound field at the current playback level. For each such non-subwoofer loudspeaker, the computing device determines the amount that the frequency range of the loudspeaker can be extended. The computing device further computes suitable parameters, such as gain, delay, and filter parameters, for each of the loudspeakers to generate an improved low-frequency sound field at the current playback level.

At step 612, the computing device determines whether one or more additional reduced playback levels remain for processing. The computing device repeats steps 606-610 for multiple reduced playback levels to generate a profile of parameters for non-subwoofer loudspeaker that can be used as auxiliary subwoofers at various reduced playback levels. The computing device repeats steps 606-610 for each non-subwoofer loudspeaker at successively lower playback levels until some threshold is reached, such as a minimum playback level, a defined number of steps, and/or the like. If additional reduced playback levels remain for processing, then the method 600 returns to step 606, described above. If, however, no reduced playback levels remain for processing, then the method 600 proceeds to step 614, where the computing device generates and stores the gain, delay, and filter parameters for the various reduced playback levels in a data store, such as data store 242 of computing device 102. The computing device can store the parameters in the form of a lookup table, a database, and/or other suitable data structure. In some examples, the computing device stores the parameters in a lookup table where each entry of the lookup table identifies, for a given playback level, the set of loudspeakers available as auxiliary subwoofer and suitable parameters for each of the selected loudspeakers. The method 600 then terminates.

Figure 7:
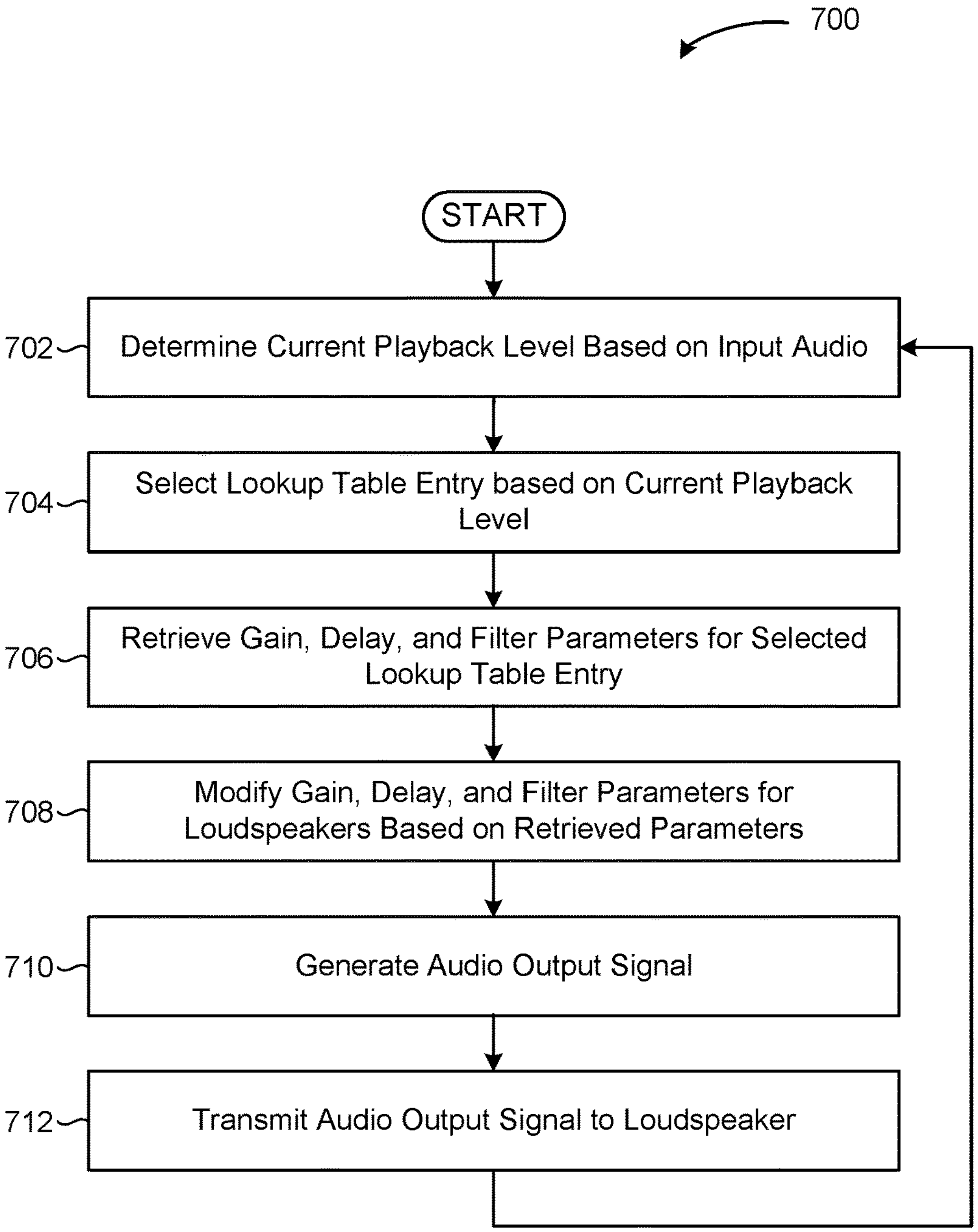
FIG. 7 is a flow diagram of method steps for dynamically adjusting a low-frequency sound field associated with an audio device, according to various embodiments.

FIG. 7 is a flow diagram of method steps for dynamically adjusting a low-frequency sound field associated with an audio device, according to various embodiments. Although the method steps are described in conjunction with the systems of FIGS. 1A-5, persons skilled in the art will understand that any system configured to perform the method steps, in any order, is within the scope of the present disclosure.

As shown, a method 700 begins at step 702, where a computing device, such as computing device 102, included in an audio device determines the current playback level of a loudspeaker in the audio system by monitoring the output of a level detector, such as level detector 108. In some examples, the level detector performs an averaging function on the playback level to reduce or avoid instantaneous changes in the loudspeaker parameters, which could lead to audible nonlinear distortion. The averaging function can average the playback level over a period of time, integrate the playback level over a period of time, and/or the like. In some examples, the computing device measures the current playback level relative to a maximum playback level. In such examples, the computing device determines that the current playback level is at a determined level below the maximum playback level, such as 3 dB below the maximum playback level, 5 dB below the maximum playback level, and/or the like.

At step 704, the computing device selects a lookup table entry from the lookup table generated at step 614 of FIG. 6 based on the current playback level detected at step 702. The computing device determines which entry of the lookup table corresponds most closely to the current playback level.

At step 706, the computing device retrieves the gain, delay, and filter parameters for the lookup table entry selected at step 704. More specifically, the computing device determines if the non-subwoofer loudspeaker is available as an auxiliary subwoofer based on the selected lookup table entry.

At step 708, the computing device modifies the parameters, such as gain, delay, and filter, used to process audio signals for the loudspeaker selected as an auxiliary subwoofer based on the lookup table entry to generate a low-frequency audio output. In operation, the parameters are used to modify how one or more of a gain stage, a delay stage, and a filter stage, such as those included in low frequency channel 110, modify the low frequency components of an audio signal. Adjusting the gain, delay, and filter settings provides improved low-frequency performance independent of loudspeaker placement when implemented in an audio sound system.

The computing device performs steps 702-708 to determine the parameters for the contribution of the non-subwoofer loudspeaker to the low-frequency sound field at the current playback level. For each such non-subwoofer loudspeaker, the computing device sets the amount that the frequency range of the loudspeaker can be extended and sets suitable parameters, such as gain, delay, and filter parameters, based on data that has been previously determined and stored, such as by method 600 of FIG. 6. By performing the steps of method 700 for all non-subwoofer loudspeakers in the audio system, the computing device generates an improved low-frequency sound field at the current playback level.

In some examples, the parameters include parameters for adjusting the filtering applied by a shelving filter. The shelving filter amplifies audio signals at frequencies below the nominal cutoff frequency of the loudspeaker. In effect, the shelving filter decreases the nominal cutoff frequency of the loudspeaker to a lower effective cutoff frequency. When the playback level for a particular loudspeaker is below the maximum playback level, computing device determines an extended cutoff frequency based on the current playback level and the operating curve of loudspeaker. The computing device sets the amplification level for frequencies below the nominal cutoff frequency such that amplitude of the low frequency signals is increased to the current playback level for midrange and high frequency signals. In this manner, the loudspeaker is effective as an auxiliary subwoofer when operating at reduced playback levels. Further, the computing device adjusts the parameters for the gain stage in order to compensate for any effect that the shelving filter applies to frequencies above the cutoff frequency. In this manner, the shelving filter impacts the low frequency portion of the loudspeaker signal and not the midrange or high frequency portions of the loudspeaker signal.

At step 710, the computing device generates an audio output signal. The computing device applies the gain stage, delay stage, and filter stage (including the shelving filter) to the audio signal to generate a low-frequency audio output. In some examples, the computing device further mixes the low-frequency audio output with a corresponding mid/high frequency audio output generated by a highpass filter in a crossover. At step 712, the computing device transmits the audio output signal to the loudspeaker being used as an auxiliary subwoofer.

The method 700 then returns to step 702, described above, to monitor the playback level of the audio system and dynamically manage the low-frequency sound field of the audio system. In some examples, the computing device performs the steps of the method 700 for each non-subwoofer loudspeaker in the audio system. By performing these steps in parallel for each of the non-subwoofer loudspeakers in parallel, the computing device generates an improved low-frequency sound field at the current playback level.

In sum, an audio device extends the frequency range of non-subwoofer loudspeakers, such as midrange loudspeakers, at certain reduced playback volumes to enhance the low-frequency sound field generated by the subwoofers. The disclosed techniques dynamically extend the low frequency limit of such midrange loudspeakers, according to the current playback volume. In this manner, the number of effective subwoofers increases and decreases dynamically based on playback volume. At lower playback volumes, the number of effective subwoofers increases, thereby generating a higher quality low-frequency sound field relative to using only the subwoofers for playing back low-frequency sounds. At playback volumes at or near the maximum level, the audio system operates normally, with only the subwoofers generating the low-frequency sound field. At reduced playback volumes, the main loudspeakers and/or surround loudspeakers are bandwidth-extended towards lower frequencies and included in the generation of the low-frequency sound field. These techniques result in a dynamic process, where low-frequency sound field generation has more options at lower playback volumes, and has a diminishing effect as the playback volume increases.

At least one technical advantage of the disclosed techniques relative to the prior art is that, with the disclosed techniques the number of effective loudspeakers within a sound system than can output low frequency sound is increased. This allows more of the loudspeakers in the sound system to output low frequencies, which improves the quality of the low-frequency sound field relative to prior art sound systems having the same loudspeakers. These technical advantages represent one or more technological improvements over prior art approaches.

1. In some embodiments, a computer-implemented method for generating a low-frequency sound field for an audio system comprises: determining that a first playback level of an audio input is less than a maximum playback level of the audio system; based on the first playback level, retrieving one or more first parameters associated with a first loudspeaker included in the audio system, wherein the one or more first parameters decrease a first cutoff frequency of the first loudspeaker to a second cutoff frequency; and modifying a first portion of an audio signal transmitted to the first loudspeaker to decrease the first cutoff frequency to the second cutoff frequency based on the one or more first parameters.

2. The computer-implemented method according to clause 1, wherein the one or more first parameters include at least one of a gain parameter, a delay parameter, or a filter parameter associated with the first loudspeaker.

3. The computer-implemented method according to clause 1 or clause 2, further comprising selecting an entry in a lookup table that includes the one or more first parameters based on the first playback level of the audio input.

4. The computer-implemented method according to any of clauses 1-3, wherein modifying the first portion of the audio signal based on the one or more first parameters comprises applying a shelving filter to amplify frequencies that are lower than the second cutoff frequency.

5. The computer-implemented method according to any of clauses 1-4, further comprising: determining that a second playback level of the audio input is different from the first playback level; and based on the second playback level, retrieving one or more second parameters associated with the first loudspeaker included in the audio system, wherein the one or more second parameters change the second cutoff frequency of the first loudspeaker to a third cutoff frequency.

6. The computer-implemented method according to any of clauses 1-5, further comprising modifying a second portion of the audio signal based on the one or more second parameters by modifying a parameter of a shelving filter to amplify frequencies that are lower than the third cutoff frequency.

7. The computer-implemented method according to any of clauses 1-6, further comprising: mixing the first portion of the audio signal with a second portion of the audio signal, wherein the second portion of the audio signal comprises frequencies above the first cutoff frequency.

8. The computer-implemented method according to any of clauses 1-7, further comprising determining the first playback level of the audio input based on playback levels of the audio input over a duration of time.

9. The computer-implemented method according to any of clauses 1-8, further comprising determining the first playback level of the audio input by: mixing a first low frequency portion of a first audio input channel with a second low frequency portion of a second audio input channel to generate a mixer output; and determining the first playback level of the audio input based on a playback level of the mixer output.

10. The computer-implemented method according to any of clauses 1-9, further comprising: applying a lowpass filter to a first audio input channel to generate the audio input; and applying a highpass filter to the first audio input channel to generate a mid/high frequency range audio output.

11. The computer-implemented method according to any of clauses 1-10, wherein the one or more first parameters determine a contribution of the first loudspeaker to the low-frequency sound field generated by the audio system.

12. In some embodiments, one or more non-transitory computer-readable media store program instructions that, when executed by one or more processors, cause the one or more processors to perform steps of: determining that a first playback level of an audio input is less than a maximum playback level of an audio system; based on the first playback level, retrieving one or more first parameters associated with a first loudspeaker included in the audio system, wherein the one or more first parameters decrease a first cutoff frequency of the first loudspeaker to a second cutoff frequency; and modifying a first portion of an audio signal transmitted to the first loudspeaker to decrease the first cutoff frequency to the second cutoff frequency based on the one or more first parameters.

13. The one or more non-transitory computer-readable media according to clause 12, wherein the one or more first parameters include at least one of a gain parameter, a delay parameter, or a filter parameter associated with the first loudspeaker.

14. The one or more non-transitory computer-readable media according to clause 12 or clause 13, wherein the steps further comprise selecting an entry in a lookup table that includes the one or more first parameters based on the first playback level of the audio input.

15. The one or more non-transitory computer-readable media according to any of clauses 12-14, wherein modifying the first portion of the audio signal based on the one or more first parameters comprises applying a shelving filter to amplify frequencies that are lower than the second cutoff frequency.

16. The one or more non-transitory computer-readable media according to any of clauses 12-15, wherein the one or more first parameters determine a contribution of the first loudspeaker to a low-frequency sound field generated by the audio system.

17. In some embodiments, an audio system comprises: a first loudspeaker; one or more memories storing instructions; and one or more processors coupled to the one or more memories and, when executing the instructions: determine that a first playback level of an audio input is less than a maximum playback level of the audio system; based on the first playback level, retrieve one or more parameters associated with the first loudspeaker included in the audio system, wherein the one or more parameters decrease a first cutoff frequency of the first loudspeaker to a second cutoff frequency; and modify a first portion of an audio signal transmitted to the first loudspeaker to decrease the first cutoff frequency to the second cutoff frequency based on the one or more parameters.

18. The audio system according to clause 17, wherein the audio system further comprises a mixer, wherein the mixer is configured mix the first portion of the audio signal with a second portion of the audio signal, wherein the second portion of the audio signal comprises frequencies above the first cutoff frequency.

19. The audio system according to clause 17 or clause 18, wherein the one or more memories further stores a lookup table, and further comprising selecting an entry in the lookup table that includes the one or more first parameters based on the first playback level of the audio input.

20. The audio system according to any of clauses 17-19, further comprising a shelving filter, wherein the shelving filter is configured based on the one or more parameters to modify the first portion of the audio signal by amplifying frequencies that are lower than the second cutoff frequency.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a low-frequency sound field for an audio system, the method comprising:

determining that a first playback level of a low-frequency portion of an audio input is less than a maximum playback level of a first loudspeaker of the audio system;

determining, based on the first playback level, an extended cutoff frequency for the first loudspeaker;

retrieving one or more first parameters associated with the first loudspeaker included in the audio system;

splitting a coherent portion of the audio input from a non-coherent portion of the audio input; and extending a frequency range of the first loudspeaker to the extended cutoff frequency by modifying, based on the one or more first parameters, the coherent portion of an audio signal transmitted to the first loudspeaker to increase output at frequencies below a first cutoff frequency of the first loudspeaker by an amount equivalent to a difference between a nominal operating curve and a reduced operating curve of the first loudspeaker.

2. The computer-implemented method of claim 1, wherein the one or more first parameters include at least one of a gain parameter, a delay parameter, or a filter parameter associated with the first loudspeaker.

3. The computer-implemented method of claim 1, further comprising selecting an entry in a lookup table that includes the one or more first parameters based on the first playback level of the audio input.

4. The computer-implemented method of claim 1, wherein modifying the coherent portion of the audio signal based on the one or more first parameters comprises applying a shelving filter to amplify frequencies that are lower than a second cutoff frequency.

5. The computer-implemented method of claim 4, further comprising:

determining that a second playback level of the audio input is different from the first playback level; and based on the second playback level, retrieving one or more second parameters associated with the first loudspeaker included in the audio system, wherein the one or more second parameters change the second cutoff frequency of the first loudspeaker to a third cutoff frequency.

6. The computer-implemented method of claim 5, further comprising modifying a second portion of the audio signal based on the one or more second parameters by modifying a parameter of the shelving filter to amplify frequencies that are lower than the third cutoff frequency.

7. The computer-implemented method of claim 1, further comprising:

mixing the coherent portion of the audio signal with a second portion of the audio signal, wherein the second portion of the audio signal comprises frequencies above the first cutoff frequency.

8. The computer-implemented method of claim 1, further comprising determining the first playback level of the audio input based on playback levels of the audio input over a duration of time.

9. The computer-implemented method of claim 1, further comprising determining the first playback level of the audio input by:

mixing a first low frequency portion of a first audio input channel with a second low frequency portion of a second audio input channel to generate a mixer output; and determining the first playback level of the audio input based on a playback level of the mixer output.

10. The computer-implemented method of claim 1, further comprising:

applying a lowpass filter to a first audio input channel to generate the audio input; and applying a highpass filter to the first audio input channel to generate a mid/high frequency range audio output.

11. The computer-implemented method of claim 1, wherein the one or more first parameters determine a contribution of the first loudspeaker to the low-frequency sound field generated by the audio system.

12. One or more non-transitory computer-readable media storing program instructions that, when executed by one or more processors, cause the one or more processors to perform steps of:

determining that a first playback level of a low-frequency portion of an audio input is less than a maximum playback level of a first loudspeaker of an audio system;

determining, based on the first playback level, an extended cutoff frequency for the first loudspeaker;

retrieving one or more first parameters associated with the first loudspeaker included in the audio system;

splitting a coherent portion of the audio input from a non-coherent portion of the audio input; and extending a frequency range of the first loudspeaker to the extended cutoff frequency by modifying, based on the one or more first parameters, the coherent portion of an audio signal transmitted to the first loudspeaker to increase output at frequencies below a first cutoff frequency of the first loudspeaker by an amount equivalent to a difference between a nominal operating curve and a reduced operating curve of the first loudspeaker.

13. The one or more non-transitory computer-readable media of claim 12, wherein the one or more first parameters include at least one of a gain parameter, a delay parameter, or a filter parameter associated with the first loudspeaker.

14. The one or more non-transitory computer-readable media of claim 12, wherein the steps further comprise selecting an entry in a lookup table that includes the one or more first parameters based on the first playback level of the audio input.

15. The one or more non-transitory computer-readable media of claim 12, wherein modifying the coherent portion of the audio signal based on the one or more first parameters comprises applying a shelving filter to amplify frequencies that are lower than a second cutoff frequency.

16. The one or more non-transitory computer-readable media of claim 12, wherein the one or more first parameters determine a contribution of the first loudspeaker to a low-frequency sound field generated by the audio system.

17. An audio system, comprising:

a first loudspeaker;

one or more memories storing instructions; and one or more processors coupled to the one or more memories and, when executing the instructions:

determine that a first playback level of a low-frequency portion of an audio input is less than a maximum playback level of the first loudspeaker of the audio system;

determine, based on the first playback level, an extended cutoff frequency for the first loudspeaker;

retrieve one or more parameters associated with the first loudspeaker included in the audio system;

splitting a coherent portion of the audio input from a non-coherent portion of the audio input; and extend a frequency range of the first loudspeaker to the extended cutoff frequency by modifying, based on the one or more parameters, the coherent portion of an audio signal transmitted to the first loudspeaker to increase output at frequencies below a first cutoff frequency of the first loudspeaker by an amount equivalent to a difference between a nominal operating curve and a reduced operating curve of the first loudspeaker.

18. The audio system of claim 17, wherein the audio system further comprises a mixer, wherein the mixer is configured mix the coherent portion of the audio signal with a second portion of the audio signal, wherein the second portion of the audio signal comprises frequencies above the first cutoff frequency.

19. The audio system of claim 17, wherein the one or more memories further stores a lookup table, and further comprising selecting an entry in the lookup table that includes the one or more parameters based on the first playback level of the audio input.

20. The audio system of claim 17, further comprising a shelving filter, wherein the shelving filter is configured based on the one or more parameters to modify the coherent portion of the audio signal by amplifying frequencies that are lower than a second cutoff frequency.

* * * * *